(12) United States Patent
Das et al.

(10) Patent No.: US 9,690,595 B2
(45) Date of Patent: Jun. 27, 2017

(54) BOOTING METHOD FOR COMPUTER SYSTEM WITH MULTIPLE CENTRAL PROCESSING UNITS

(71) Applicant: Huawei Technologies Co., Ltd., Shenzhen (CN)

(72) Inventors: Shayori Das, Bangalore (IN); Aman Shahi, Bangalore (IN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/855,328

(22) Filed: Sep. 15, 2015

(65) Prior Publication Data

US 2016/0004542 A1 Jan. 7, 2016

Related U.S. Application Data

(63) Continuation of application No. PCT/CN2013/072764, filed on Mar. 15, 2013.

(51) Int. Cl.
*G06F 9/44* (2006.01)

(52) U.S. Cl.
CPC .................................. *G06F 9/4405* (2013.01)

(58) Field of Classification Search
None
See application file for complete search history.

(56) References Cited

U.S. PATENT DOCUMENTS

| | | | |
|---|---|---|---|
| 6,158,000 A | 12/2000 | Collins | |
| 6,336,185 B1 | 1/2002 | Sargenti, Jr. et al. | |
| 6,401,202 B1 | 6/2002 | Abgrall | |
| 6,732,264 B1 | 5/2004 | Sun et al. | |
| 7,987,336 B2 | 7/2011 | Kirscht et al. | |
| 2005/0038981 A1 | 2/2005 | Connor et al. | |
| 2009/0113558 A1 | 4/2009 | Prabhakaran et al. | |
| 2009/0228895 A1 | 9/2009 | Ding | |
| 2011/0126209 A1 | 5/2011 | Housty | |

FOREIGN PATENT DOCUMENTS

| | | |
|---|---|---|
| CN | 102648453 A | 8/2012 |
| JP | 2002525745 A | 8/2002 |
| JP | 2009104443 A | 5/2009 |
| JP | 2011232791 A | 11/2011 |
| RU | 2456663 C2 | 7/2012 |
| WO | WO 0017750 A1 | 3/2000 |

OTHER PUBLICATIONS

Sheikh et al., "Booting an RTOS on symmetric multiprocessors," Embedded, UBM Electronics, www.embedded.com/design/operating-systems/4207335/Booting-an-RTOS-on-symmetric-multiprocessors, Sep. 3, 2010.

*Primary Examiner* — Eric C Wai
(74) *Attorney, Agent, or Firm* — Leydig, Voit & Mayer, Ltd.

(57) ABSTRACT

A booting method for computer system with multiple central processing units is provided. The method includes: initializing at least two CPUs of the multiple CPUs at start of a booting process; accessing, by each of the at least two initialized CPUs, a task description chart (TDC) stored in the computer system, wherein the TDC includes information of at least two tasks of the booting process; and selecting, by each of the at least two initialized CPUs, a task from at least two tasks according to selection information of the at least two tasks in the TDC; obtaining, by each of the at least two initialized CPUs, the selected task according to address information of the selected task in the TDC; and executing, by the initialized CPUs, the selected tasks at least partially in parallel.

20 Claims, 7 Drawing Sheets

BOOTING METHOD FOR COMPUTER SYSTEM WITH MULTIPLE CENTRAL PROCESSING UNITS

CROSS-REFERENCE TO RELATED APPLICATIONS

This application is a continuation of International Patent Application No. PCT/CN2013/072764, filed on Mar. 15, 2013, which is hereby incorporated by reference in its entirety.

TECHNICAL FIELD

The present application generally relates to computer technologies, and more particularly to a method for booting a computer system having multiple central processing units (CPUs).

BACKGROUND

Booting of a computer system is a bootstrapping process. When the computer system is powered on, the process initializes the computer system hardware and then starts an operating system (e.g. a kernel). A brief booting sequence normally starts with a basic input output system (BIOS), a boot loader then the kernel.

When the computer system is powered on, the BIOS performs a power on self test (POST) that initializes devices including Random Access Memory (RAM), processor, keyboard, and monitor etc. Normally, a processor in a computer system is a functional hardware unit that includes single CPU or multiple CPUs (often called single-core processor or multi-core processor). Or, a computer system may include multiple processors. If the computer system includes multiple CPUs (e.g. in the forms of multi-processor system or multi-core processor system), one of the CPUs may be determined to be a "boot CPU" which executes the BIOS initialization codes and kernel initialization codes for the booting process. The remaining CPUs (often called application processors (APs)) remain idle till the OS starts executing. Once the BIOS initialization is done, a boot device is identified and the boot loader is loaded from the boot device to the RAM and control is passed to the boot loader. The boot loader determines which OS (e.g. kernel) to boot, loads the determined OS from the boot device to the RAM and passes the control to the OS. Once the OS starts executing, it initializes resources and data structure, the remaining CPUs and executes an initial script which initializes various services.

In the most existing computer systems, the above-described booting steps are executed sequentially by one CPU only. An amount of time is spent in the booting process, and reducing the booting time is a major concern.

SUMMARY

For saving the booting time of the computer system with multiple CPUs, various embodiments are provided by this disclosure.

As a first aspect of the disclosure, a method for booting a computer system with multiple CPUs is provided. The method includes: initializing at least two CPUs of the multiple CPUs at start of a booting process; accessing, by each of the at least two initialized CPUs, a task description chart (TDC) stored in the computer system, wherein the TDC includes information of at least two tasks of the booting process; and selecting, by each of the at least two initialized CPUs, a task from at least two tasks according to selection information of the at least two tasks in the TDC; obtaining, by each of the at least two initialized CPUs, the selected task according to address information of the selected task in the TDC; and executing, by the initialized CPUs, the selected tasks at least partially in parallel.

As a second aspect of the disclosure, a computer system is provided. The computer system includes: multiple CPUs coupled with a memory, wherein at least two CPUs of the multiple CPUs are initialized at start of a booting process; the memory is configured to store a TDC and a first instruction, wherein the TDC includes information of at least two tasks of the booting process; and the at least two initialized CPUs of the multiple CPUs are configured to according to the first instruction each access the TDC, each select a task from the at least two tasks according to selection information of the at least two tasks in the TDC, each obtain the selected task according to address information of the selected task in the TDC; and execute the selected tasks at least partially in parallel.

As a third aspect of the disclosure, a non-transitory computer readable medium containing codes for booting a computer system with multiple CPUs is provided. The codes when executed by multiple initialized CPUs of the multiple CPUs performs the steps of: accessing, by each of the initialized CPUs, a TDC stored in the computer system, wherein the TDC includes information of at least two tasks of a booting process; and selecting, by each of the initialized CPUs, a task from at least two tasks according to selection information of the at least two tasks in the TDC; obtaining, by each of the initialized CPUs, the selected task according to address information of the selected task in the TDC; and executing, by the initialized CPUs, the selected tasks at least partially in parallel.

As a fourth aspect of the disclosure, a data table is provided. The data table includes: a selection information field, configured to indicate selection information corresponding to at least two tasks; and an address information field, configured to indicate address information corresponding to the at least two tasks; wherein multiple initialized CPUs of a computer system with multiple CPUs select tasks from the at least two tasks according to the selection information field, obtain the selected tasks according to the address information field, and execute the selected tasks at least partially in parallel.

As a fifth aspect of the disclosure, another method for booting a computer system with multiple CPUs is provided, the method comprises: initializing, by an initializing circuit of the computer system, one or more CPUs of the computer system; selecting, by each of the initialized CPUs, a task from at least two task according to a TDC stored in the computer system, wherein each task has its selection information and address information recorded in the TDC, and different tasks are selected from the least two task by different initialized CPUs according to the selection information of the tasks; obtaining, by each of the initialized CPUs, program instructions of the selected task according to address information of the selected task; and executing, by the initialized CPUs, the selected tasks at least partially simultaneously; wherein the TDC includes information of all tasks for a booting process, and wherein the initialized CPUs continue to select and execute the tasks according to the TDC until all tasks whose information is in the TDC are executed.

DETAILED DESCRIPTION

In order to make the aforementioned objectives, technical solutions and advantages of the present application more comprehensible, embodiments are described below with accompanying figures.

Figure 1:
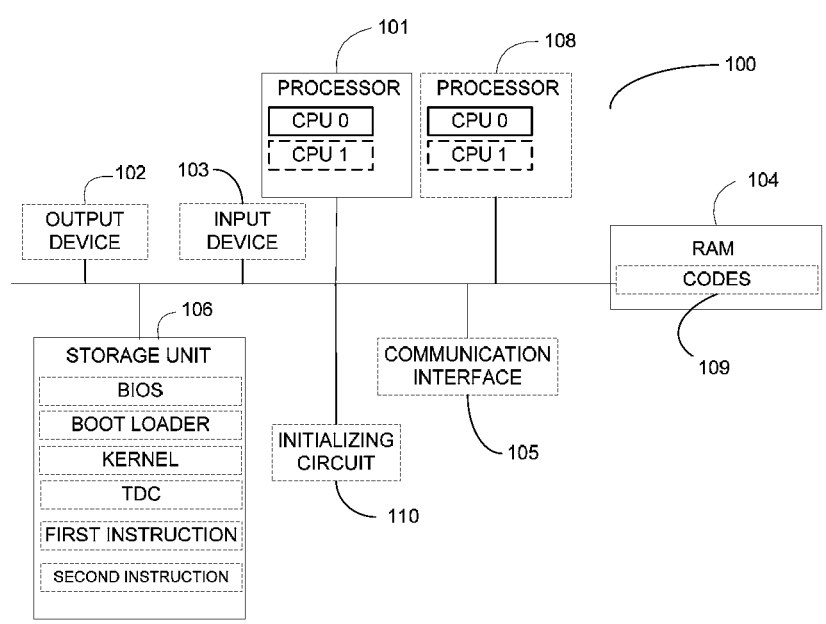
FIG. 1 is a block diagram of a computer system in accordance with an embodiment of the disclosure.

FIG. 1 is a block diagram of a computer system 100 in accordance with an embodiment of the disclosure. Computer system 100 includes a processor 101, coupled with a memory such as a random access memory (RAM) 104, and optionally coupled with a storage unit 106. The storage unit 106 may be a read-only memory (ROM) or other storage media (e.g. hard disk or flash memory etc.).

The processor 101 may include multiple CPUs, such as CPU 0 and CPU 1 shown in FIG. 1. Optionally, the computer system 100 includes more than one processor, e.g. processor 101 and processor 108 in FIG. 1. Each of the processors 101 and 108 may be either a single-core processor or a multi-core processor.

Various codes for a CPU of the processor 101 to execute may be stored in either the RAM 104 or the storage unit 106. Optionally, codes 109 are copied into the RAM 104 from the storage unit 106 for the processor 101 to execute. Optionally, the codes stored in the storage unit includes, but not limited to, any one or combination of a BIOS module, a boot loader module, a kennel module. Also in the storage unit are a task description chart (TDC), a first instruction and a second instruction which will be discussed in detail later.

Optionally, the computer system further includes an output device 102 (e.g. a display device such as a LCD (liquid Crystal display), a LED (light emitting diode) display, a CRT (cathode ray tube) or a projector), and an input device 103 (e.g. a mouse, a keyboard, a touch screen, or a censoring device capable of detecting an input of a user). The output device 102 is controlled by the processor 101 for displaying a graphic interaction interface. Optionally, the computer system further includes a communication interface 105 for exchanging data or signals with an external network or other devices. Above various codes for a CPU of the processor 101 to execute (such as anyone or combination of the BIOS module, the boot loader module, the kennel module, the TDC, the first instruction and the second instruction) may be obtained through the communication interface 105 from other device.

The above elements of the computer system 100 may be coupled with each other by a bus, such as a data bus, an address bus, a control bus, an expansion bus or a local bus, etc.

The computer system 100 may be a desktop computer, a network server, a personal digital assistant (PDA), a mobile phone, a tablet, a terminal device, a telecom device, an embedded system or any other devices having similar structure as shown in FIG. 1. However, the present disclosure is not limited by any particular types of the computer system.

Figure 2:
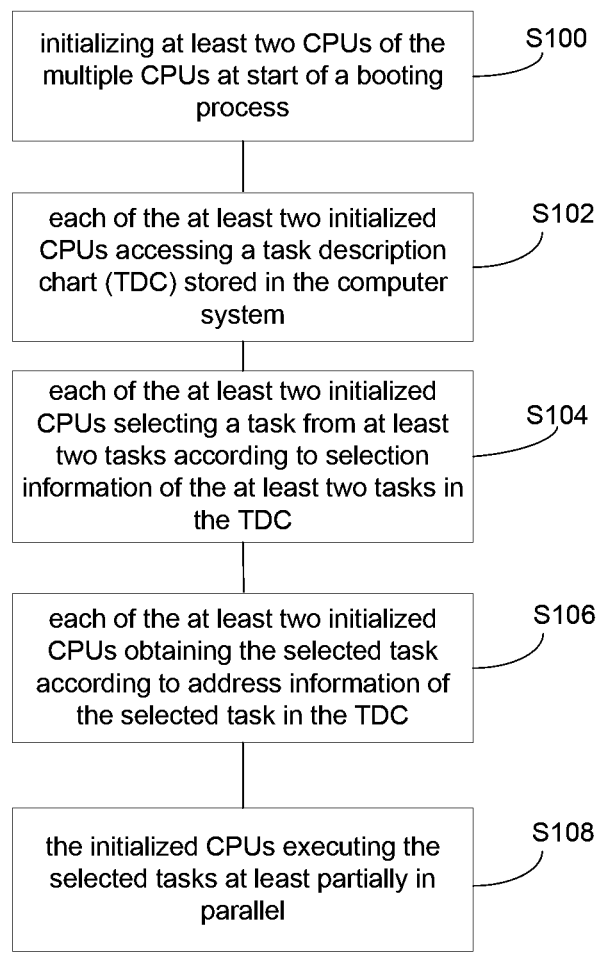
FIG. 2 is a flowchart of a method for executing tasks in parallel in accordance with an embodiment of the disclosure.

A method for booting the computer system with multiple CPUs is provided. FIG. 2 is a flowchart of the method. Although the method described here may be implemented in the computer system 100 shown in FIG. 1, it is not limited to such a system.

For the computer system that includes multiple CPUs, and at least two CPUs are involved in the booting process, the method includes the following blocks:

S100: initializing at least two CPUs of the multiple CPUs at start of a booting process;

Optionally, the at least two CPUs that are involved in the booting process are initialized by an initializing circuit 110 coupled to the CPUs (see FIG. 1) of the computer system. The initializing circuit is that, upon power on or reset of the computer system, it initializes components of the computer system, including the at least two CPUs that are involved in the booting process. The initializing circuit may also initialize the RAM 104 for use by the at least two CPUs. Alternatively, the initializing circuit may first initialize part of the at least two CPUs, for example a boot CPU of the at least two CPUs, and then initialize the rest. For example, the initialized boot CPU may access the storage medium 106 to obtain a second instructions stored in the storage medium 106, and initialize the remaining CPU(s) according to the second instruction.

Figure 3:
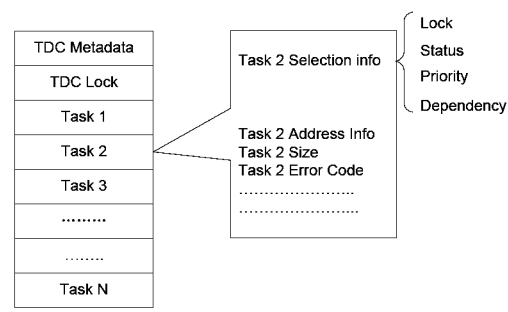
FIG. 3 shows a structure of a task description chart (TDC) in accordance with an embodiment of the disclosure.

S102: each of the at least two initialized CPUs accessing a task description chart (TDC) stored in the computer system, wherein the TDC includes information of at least two tasks of the booting process;

Optionally, when a first CPU of the initialized CPUs accesses the TDC, the first CPU locks the TDC, and the locked TDC is not accessible by CPUs other than the first CPU. For example, as shown in FIG. 3, the TDC may include a "TDC lock" field. For locking the TDC, the first CPU may mark the TDC lock field of the TDC as locked.

S104: each of the at least two initialized CPUs selecting a task from at least two tasks according to selection information of the at least two tasks in the TDC;

Optionally, the selection information further comprise a priority field indicating a priority of each of the at least two tasks, and a task with a higher priority among the at least two tasks is first selected by the first CPU.

Optionally, the selection information further comprise a dependency field indicating a second task from which a first task in the at least two tasks depends, and the first task is selectable by the first CPU when the second task is marked as completed.

Optionally, the selection information further comprise a lock field indicating whether each of the at least two task is locked by an initialized CPU, wherein after the first CPU selecting a third task in the at least two tasks according to the selection information, the first CPU marks a lock field of the third task as locked, and wherein the third task been marked as locked is not selectable by the initialized CPUs other than the first CPU.

Optionally, the selection information further comprise a status field indicating whether each of the at least two task is completed, and wherein after completing an execution of a fourth task in the at least two tasks, the first CPU marks a status field of the fourth task as completed, and wherein the fourth task been marked as completed is not selectable by the initialized CPUs.

Optionally, after the first CPU finishing the selecting, the first CPU unlocks the TDC.

S106: each of the at least two initialized CPUs obtaining the selected task according to address information of the selected task in the TDC;

S108: the initialized CPUs executing the selected tasks at least partially in parallel.

Optionally, the selection information further comprise a size field indicating a size of each of the at least two tasks, and the first CPU determines whether to execute a fifth task of the at least two tasks according to an available memory for executing tasks and size fields of the fifth task and tasks being executed in the available memory.

Optionally, after the step of the initializing, steps of the accessing, the selecting, the obtaining and the execution by the initialized CPUs are repeated until all tasks whose information is in the TDC are executed.

Above steps S102 to S108 n may be done by the first CPU according to the first instruction.

Optionally, the at least two tasks include tasks executable in parallel by the initialized CPUs, and are from the booting process of the computer system which includes a basic input output system (BIOS) module, a boot loader module and a kernel module.

Optionally, steps from the BIOS module, the boot loader module and the kernel module are modularized into steps including independent or asynchronous steps, and the modularized steps are separated out to form tasks of the at least two tasks.

Optionally, peripheral devices initialization steps in the BIOS module are divided into initialization steps for initializing a device other than modifying a configuration register and register steps for modifying the configuration register based on the initialization steps, and the initialization steps and the register steps are separated out to form different tasks of the at least two tasks.

Optionally, the TDC is generated according to tasks generated from the modularization and the separation.

As shown in FIG. 3, an exemplary TDC includes address information and selection information of a plurality of tasks (e.g. task 1 to task N, N≥2). Each of the initialized CPUs involved in the booting process selects a task of the at least two tasks according to the selection information, obtains the selected task from the storage unit 106 or RAM 104 according to the address information of the task and executes the obtained task.

The TDC may include a TDC metadata field indicating information about the TDC file, which may be used by a process for handling the file content and security related issues etc. The TDC lock field may be a part of the TDC metadata field.

Following is an example of two initialized CPUs (e.g. CPU 1 and CPU 2) selecting tasks from 3 tasks in a TDC (e.g. task 1, task 2 and task 3) with different selection information (such as lock, status, priority and dependency) according to the TDC. The selection information of tasks 1 to 3 is shown in table 1.

TABLE 1

| Task | Selection info | | | |
| --- | --- | --- | --- | --- |
|  | Lock | Status | Priority | Dependency |
| Task 1 | Unlocked | Uncompleted | 1 | None |
| Task 2 | Unlocked | Uncompleted | 2 | Task 1 |
| Task 3 | Unlocked | Uncompleted | 3 | None |

When CPU 1 accesses the TDC, it may select task 1 for execution according to the selection information, because task 1 has the highest priority among the tasks 1 to 3 and it is marked as "unlocked". After selecting the task 1, the CPU 1 may mark the lock field of task 1 as "locked". Then, CPU 2 accesses the TDC for selecting a task. Because: 1) the lock field of task 1 indicates that the task 1 is locked (i.e. task 1 with highest priority is already selected by the CPU 1); 2) the task 2 with second-highest priority depends on the task 1, and 3) the status field of the task 1 indicates that the task 1 is uncompleted, the CPU 2 selects the task 3 with the third-highest priority for execution according to the selection information. After selecting the task 3, the CPU 2 may mark the lock field of the task 3 as "locked". After executing the task 1, the CPU 1 may re-access the TDC, mark the status field of the task 1 as "completed", and select another task in the TDC for execution. Because: 1) the lock field of task 3 indicates that task 3 is "locked", and the status field of the task 1 indicates that task 1 is "completed" (i.e. tasks 1 and 3 are not selectable), the CPU 1 may select the task 2 which is now selectable due to the completion of the task 1. The above task selection and modification of the selection information may be done by a scheduler application run on the processor according to the first instruction.

During a booting process, the memory (such as RAM 104) may be partly initialized. Therefore, there is limited memory space available for tasks with certain size being executed in parallel. If many big size tasks are executed in parallel, then another task may not be executed/or copied to the memory. For solving this problem, a memory manager (e.g. a memory manger application run by one of the CPUs) is provided in the embodiment for managing the memory. The TDC may further include a size field of the tasks. The size field may indicate the size of a corresponding task. The scheduler application may further decide which task to be executed or not to be executed currently according to the available memory, the information about which is provided by the memory manager, and the size field (such as size of the tasks been executed and tasks to be executed later). For example, the scheduler application may access the TDC to modify the selection information of a task (such as any or any combination of the lock field, the status filed, the priority field and the dependency field). Accordingly, the execution sequence of the tasks may be dynamically adjusted for better use of the memory. The memory manager may also trigger an initialization of other parts of the memory when needed. The initialization of other parts of the memory may be executed in parallel with other tasks.

In the embodiment, tasks are scheduled based on the TDC which acts as a pivot for the scheduling. Basic memory management may also be achieved by using this TDC.

Optionally, the selection information may further include an error code field for possible debugging. For example, if a task is failed during execution, selecting or management of the memory manager, a corresponding error code will be put in the error code field of that task.

As an example, the program codes of the tasks, the first instruction or the second instruction may be stored in the storage unit 106 or been read into RAM 104. According to the first instruction and the TDC, each initialized CPU that is involved in the boot process may access the storage unit 106 or the RAM 104, to execute the task it selected. An initialized CPU serving as a boot CPU may initialize other CPUs and activate them using start-up inter-processor interrupts (IPI). Execution of the initialized CPUs may start at a real mode start address specified by the IPI message. This start address corresponds to the first instruction for the initialized CPUs to select and execute the task according to the TDC.

In order to reduce the booting time, it is instructed that the at least two tasks selected by the initialized CPUs that are involved in the booting process are executed at least partially simultaneously.

Through the technical solution in the above embodiment of the disclosure, time for executing tasks may be reduced by execution in at least partially parallel. It can be understood that it is possible that the more CPUs are utilized by this solution, the more execution time may be saved in the booting process.

Figure 4:
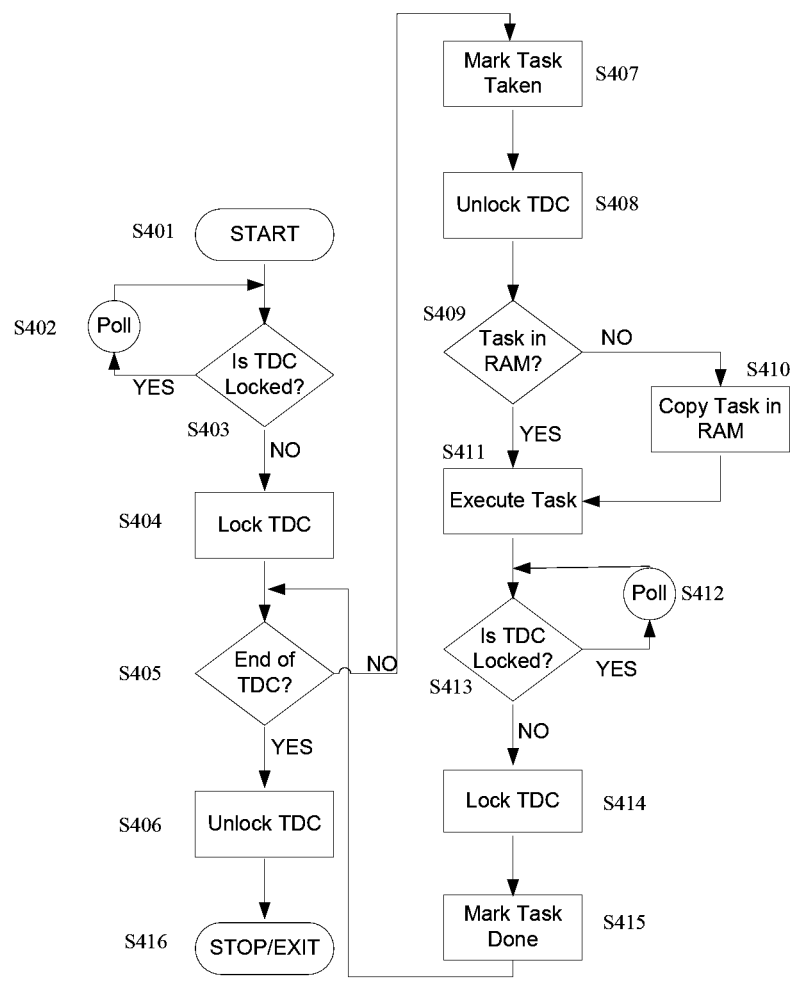
FIG. 4 is a flowchart of a procedure of a CPU selecting and executing tasks from a TDC, in accordance with an embodiment of the disclosure.

FIG. 4 is a flowchart of an exemplary procedure for a CPU to select and execute tasks from a TDC in accordance with an embodiment of the disclosure. The method includes following blocks:

In block S401, a CPU loads the above mentioned first instruction, and starts to execute the first instruction. As stated previously, the first instruction is used for the CPU to select and execute tasks according to a TDC. After block S401, the CPU first executes block S403;

In block S403, the CPU determines whether the TDC is locked. If the TDC is locked, the CPU executes block S402. If the TDC is unlocked, the CPU executes block S404;

In block 402, the CPU waits/polls for a while, then goes to block S403 to re-determine whether the TDC is locked.

The lock attribute is used as a synchronization mechanism in this embodiment to restrict/limit access to data in TDC which may be shared between multiple processes. It allows one process, for example, controlled by a CPU, to access that data at a given instance/time. So even though multiple processes, for example, controlled by multiple CPUs, can access/modify the shared data, at any given instance/time, only the process having lock on that data can access/modify it. This data can be accessed/modified by another process only when it acquires the lock on the data (when the process previously holding the lock on this data, releases the lock).

In block S404, the CPU locks the corresponding fields of the TDC. For example, the CPU may mark the lock field of the task to be executed by it in the TDC as locked with an identification of the CPU, to protect the same data in TDC from accessing by other CPU.

In block S405, the CPU determines whether all the tasks in the TDC have been completed according to the selection information of the tasks. If not all the tasks in the TDC have been completed, the CPU executes block S407. If all the tasks in the TDC have been completed, the CPU executes block S406 or may directly execute block S416.

In block S406, the CPU unlocks the task in TDC. For example, the CPU may mark the lock field of the task in TDC as "unlocked". Then the CPU may execute block S416.

In block S407, the CPU selects a task from the TDC according to the selection information of the TDC, and locks the selected task. The specific task selection strategy has already been described above. To be concise, it will be not restated here.

In block S408, the CPU unlocks the task in TDC and goes to execute block S409 or directly go to execute block S411. After block S408, other CPUs may access the TDC for task selection.

In block S409, the CPU determines whether the selected task is already in the RAM. If yes, the CPU goes to execute block S411. If not, the CPU goes to execute block S410.

In block S410, the CPU copies the task to be executed into the RAM. Then the CPU goes to execute block S411. For example, the CPU may search the code of the task in the storage unit according to the address information of the task, and copy the code of the task into the RAM from the storage unit for execution.

In block S411, the CPU executes the selected task. After completing the execution of the selected task, the CPU may go to execute block S413. Optionally, before the execution, the CPU searches the selected task in the RAM according to the address information of the task and obtains the selected task.

In block S413, the CPU determines whether the TDC is locked. If the TDC is locked, the CPU executes block S412. If the TDC is unlocked, the CPU executes block S414;

In block 412, the CPU waits/polls for a while, then go to block S413 to re-determine whether the TDC is locked.

In block S414, the CPU locks the task in the TDC. Then, the CPU goes to execute block S415.

In block S415, the CPU marks the status field in the selection information of the completed task as "completed". Then the CPU may go to block S405.

In block S416, the CPU exits the selection and execution procedure shown in FIG. 4. For example, the CPU may stop the execution of the first instruction.

Figure 5:
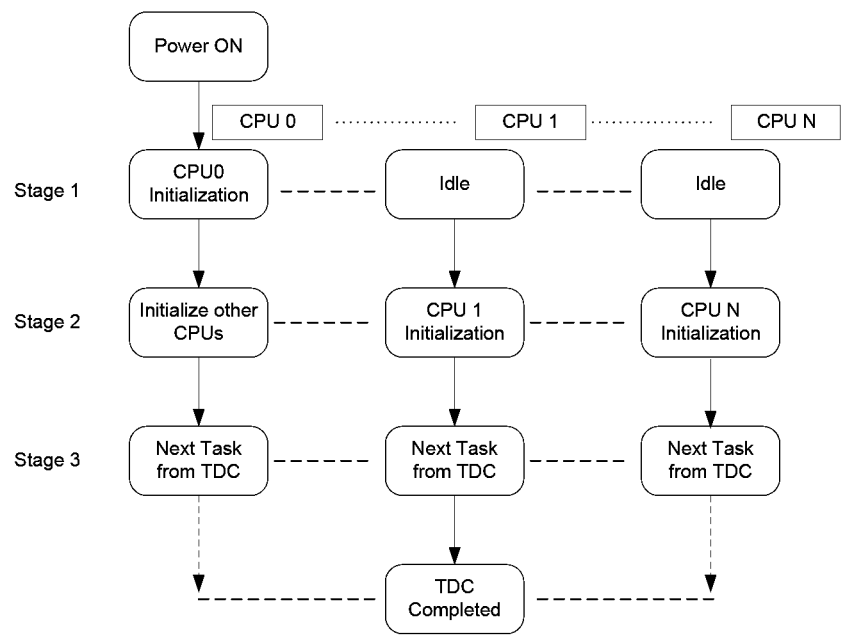
FIG. 5 is a flowchart of multiple CPUs executing tasks in parallel, according to an embodiment of the disclosure.

FIG. 5 is a flowchart of multiple CPUs executing tasks in parallel in accordance with an embodiment of the disclosure.

As shown in FIG. 5, at an optional stage 1, power-on or reset of the computer system may initialize all or part of the multiple CPUs (e.g. CPU 0 of the CPUs 0-N). Some or all of the initialized CPUs may be involved in the boot process.

Optionally, when there is only the CPU 0 as a boot CPU been initialized during the stage 1 and other CPUs are in idle state (or uninitialized state), the initialized CPU 0 initializes the remaining CPUs at an optional stage 2.

At a stage 3, the initialized CPUs may select tasks from the TDC and execute them independently and at least partially simultaneously in a way shown, for example, in FIG. 4, until all the tasks in the TDC are completed.

Through the above-described parallel execution by multiple CPUs, time for executing tasks in a booting process in a multiple-CPU computer system CPUs may be reduced. For example, the booting time may be decreased to $90/100*(X/N-N*D*X)$, where X is the current booting time and N is the number of CPUs, D is the time period for a CPU to select a next task in the TDC. This is just an estimation, and it may not be scalable beyond certain numbers.

It is noted that the above embodiment with respect to parallel execution by multiple CPUs may be implemented in various processes in a computer system, not just in a booting process. However, the booting process may be the one which gains great benefit from the parallel execution. As mentioned above, a typical booting process includes a BIOS module, a boot loader module and a kernel module. The BIOS module is used to initialize and test the system hardware components. The BIOS module may be any kind of system realizing at least the function of initializing and testing the system hardware components, such as basic input/output system, Unified Extensible Firmware Interface (UEFI) and Extensible Firmware Interface (EFI)). The boot loader is a module invoked by the BIOS to load an image of a kernel into the RAM. The kernel is a main component of most computer operating systems. It is a bridge between applications and the actual data processing done at the hardware level. After the boot loader module is done, the kernel module may be executed for initializing the resources and data structure of the kernel.

Figure 6:
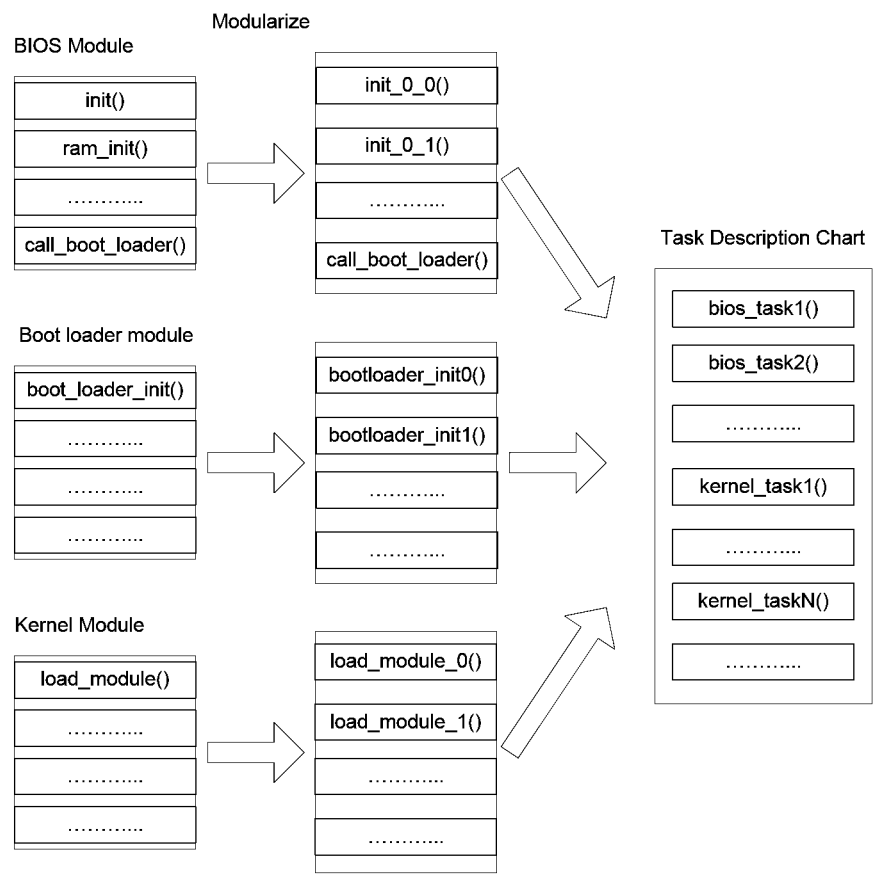
FIG. 6 is an exemplary structure of a TDC, and a modularization process of generating the TDC for a booting process.

It is well known that the three modules in the booting process each includes various execution steps. As shown in FIG. 6, in order to implement the multi-CPU execution in the booting process, the steps of the three modules may be inter-arranged in a procedure called "modularize", i.e. each module may be broken into sections. Each section may include one or several independent or asynchronous steps. Referring to FIG. 6, for example, steps of init( ) in the BIOS module may be broken into steps of init_0_0( ) and init_0_1( ) which are independent from each other. Another specific modularization example on BIOS module is also provided here. Peripheral devices initialization steps in the BIOS module are used to be executed sequentially as configuration registers can be modified by only one process at a given time/instance. In this embodiment, peripheral devices initialization steps may be broken into two smaller groups of steps: initialization steps for initializing a device other than modifying the configuration registers and register steps for modifying the configuration registers based on the initialization step. Thus, the initialization steps for initializing multiple peripheral devices can be executed by multiple CPUs in parallel. And the register steps with respect to the multiple peripheral devices may be executed by a CPU sequentially later when needed. Similar modularization may be implemented on the boot module and kernel module. For shared resources, it may be accessed by multiple CPUs using locks for synchronizing.

The modularized steps may then be separated out to form individual tasks. For example, the modularized steps in the BIOS module may be grouped into tasks of bios_task1( ) and bios_task2( ) At least two tasks of the grouped tasks may be simultaneously executable tasks. The sequence of the tasks may be determined according to a set priority of each task. For example, tasks from boot loader module may be set to be executed in parallel to tasks from BIOS module. Thus, tasks like copying of kernel and decompression may be achieved while the BIOS module completes its execution. The TDC describing these tasks may be generated according to at least one following attributes of each task: priority, dependency, address, size, error code, lock, status and the dependency.

Optionally, an Interrupt Vector Table (IVT) is initialized for all CPUs during execution of part or all the steps from the BIOS module. IVT is a table associated with a CPU which contains a mapping of interrupts and interrupt handlers. It is a table which tells the CPU, that on receiving a particular interrupt, which interrupt handler (program/function) to execute.

Optionally, the initialization of the RAM is done in phases. In each phase, only part of the area of the RAM is be initialized. For example, only area of the RAM for copying tasks of the BIOS module and boot loader module will be initialized in a first phase and/or second phase. The initialization of the rest area of the RAM for copying tasks of the kernel module may be done in a third phase. Optionally, as the TDC includes size of each task, the initialization of the RAM can be handled in a more granular way. For example, the initialization of the RAM can be done in multiple phases according to the sequence and size of the tasks in the TDC. Optionally, the initialization of the RAM as a task in the TDC is done in parallel with other boot tasks.

Figure 7:
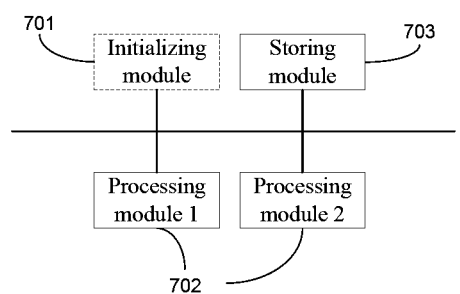
FIG. 7 is a block diagram of an apparatus for booting a computer system.

As shown in FIG. 7, it is block diagram of an apparatus for booting a computer system. The apparatus includes: multiple processing modules 702 (including at least two processing modules such as processing module 1 and processing module 2) and a storing module 703, wherein at least two processing modules of the multiple processing modules 702 are initialized at start of a booting process; the storing module 703 is configured to store a task description chart (TDC), wherein the TDC includes information of at least two tasks of a booting process; and the initialized processing modules of the multiple processing modules are configured to each access the TDC, each select a task from the at least two tasks according to selection information of the at least two tasks in the TDC, each obtain the selected task according to address information of the selected task in the TDC; and execute the selected tasks at least partially in parallel.

Optionally, multiple processing modules 702 correspond to the processor 101 and/or processor 108 in FIG. 1. The storing module correspond to the storage unit 106 and RAM 104 in FIG. 1.

Optionally, a first processing module of the initialized processing modules is further configured to lock the TDC after accessing the TDC, and wherein the locked TDC is not accessible by processing modules other than the first processing module.

Optionally, the selection information further comprises a priority field indicating a priority of each of the at least two tasks, and wherein the first processing module is further configured to first select a task with a higher priority among the at least two tasks.

Optionally, the selection information further comprises a dependency field indicating a second task from which a first task in the at least two tasks depends, and wherein the first processing module is further configured to select the first task when the second task is marked as completed.

Optionally, the selection information further comprise a lock field indicating whether each of the at least two task is locked by an initialized processing module, wherein the first processing module is further configured to lock a third task in the at least two tasks after the first processing module selecting the third task, and wherein the third task been marked as locked is not selectable by the initialized processing modules other than the first processing module.

Optionally, the selection information further comprise a status field indicating whether each of the at least two task is completed, wherein the first processing module is further configured to mark a status field of a fourth task in the at least two tasks as completed after completing an execution of the fourth task, and wherein the fourth task been marked as completed is not selectable by the initialized processing modules.

Optionally, the first processing module is further configured to unlock the TDC after the first processing module finishing the selecting.

Optionally, the apparatus further comprises an initializing module 701 configured to initialize a processing module of the multiple processing modules as a booting processing module; wherein the booting processing module is configured to initialize other processing modules of the multiple processing modules.

Optionally, the at least two tasks include tasks executable in parallel by the initialized processing modules, and are from the booting process which includes a basic input output system (BIOS) module, a boot loader module and a kernel module.

Optionally, steps from the BIOS module, the boot loader module and the kernel module are modularized into steps including independent or asynchronous steps, and the modularized steps are separated out to form tasks of the at least two tasks.

Optionally, peripheral devices initialization steps in the BIOS module are divided into initialization steps for initializing a device other than modifying a configuration register and register steps for modifying the configuration register based on the initialization steps, and the initialization steps and the register steps are separated out to form different tasks of the at least two tasks.

Optionally, the selection information further comprise a size field indicating a size of each of the at least two tasks, and Optionally, the first processing module is further configured to determine whether to execute a fifth task of the at least two tasks according to an available memory for executing tasks and size fields of the fifth task and tasks being executed in the available memory.

Optionally, the at least two initialized processing modules are configured to continue to select and execute the tasks according to the TDC until all tasks whose information is in the TDC are executed.

Persons of ordinary skill in the art should understand that all or part of the steps of the method of the present application may be implemented by a computer program instructing relevant hardware. The program may be stored in a computer readable storage medium. When the program is run, the program executes the method specified in any embodiment of the present application. The storage medium may be a magnetic disk, an optical disk, Read-Only Memory (ROM), or Random Access Memory (RAM).

Finally, it should be understood that the above embodiments are only used to explain, but not to limit the technical solution of the present application. Despite the detailed description of the present application with reference to above preferred embodiments, it should be understood that various modifications, changes or equivalent replacements can be made by those skilled in the art without departing from the scope of the present application and covered in the claims of the present application.

What is claimed is:

1. A method for booting a computer system having multiple Central Processing Units (CPUs), comprising:
   initializing at least two CPUs of the multiple CPUs at start of a booting process;
   accessing, by each of the at least two initialed CPUs, a task description chart (TDC) stored in the computer system, wherein when a first CPU of the at least two initialized CPUs accesses the TDC, the first CPU locks the TDC, and the locked TDC is not accessible by CPUs other than the first CPU;
   selecting, by each of the at least two initialized CPUs, a task according to the TDC, wherein the TDC includes information of a plurality of tasks of the booting process and selection information of the tasks; and
   executing, by the at least two initialized CPUs, the selected tasks at least partially in parallel.

2. The method according to claim 1, wherein the selection information of the tasks further comprises a priority field indicating a priority of each of the tasks, and a task with a highest priority is first selected by the first CPU.

3. The method according to claim 1, wherein the selection information further comprises a dependency field indicating a dependency of a first task from a second task, and the first task is selectable when the second task is marked as completed.

4. The method according to claim 1, wherein after the first CPU selects a third task according to the selection information, the first CPU marks a lock field of the third task as locked, and wherein the third task being marked as locked is not selectable by the initialized CPUs other than the first CPU.

5. The method according to claim 1, wherein the selection information further comprises a status field indicating whether any of the tasks is completed, and wherein after completing an execution of a task, the CPU executing the task marks in the status field of the task as completed, and wherein the task being marked as completed is not selectable by the initialized CPUs.

6. A computer system, comprising:
   a memory configured to store a task description chart (TDC) and a first instruction, wherein the TDC includes information of a plurality of tasks of a booting process of the computer system and selection information of the tasks; and
   multiple Central Processing Units (CPUs) coupled with the memory, wherein at least two CPUs of the multiple CPUs are initialized at a start of the booting process, wherein by executing the first instruction, each of the at least two initialized CPUs is configured to access the TDC, and select a task according to the TDC, and wherein a first CPU of the at least two initialized CPUs is configured to lock the TDC after accessing the TDC according to the first instruction, and the locked TDC is not accessible by CPUs other than the first CPU.

7. The computer system according to claim 6, wherein the selection information of the tasks further comprises a priority field indicating a priority of each of the tasks, and the first CPU is configured select a task with a highest priority among the tasks in the TDC.

8. The computer system according to claim 6, wherein the selection information further comprises a dependency field indicating a dependency of a first task from a second task, and the first task is selectable when the second task is marked as completed.

9. The computer system according to claim 6, wherein the first CPU is further configured to mark a lock field of a third task after the first CPU selects the third task, and wherein the third task being marked as locked is not selectable by the initialized CPUs other than the first CPU.

10. The computer system according to claim 6, wherein the selection information further comprises a status field indicating whether any of the tasks is completed, and wherein after completing an execution of a task, the CPU executing the task is configured to mark in the status field of the task as completed, and wherein the task being marked as completed is not selectable by the initialized CPUs.

11. The computer system according to claim 6, further comprising:
   an initializing circuit configured to initialize a CPU of the multiple CPUs as a boot CPU, wherein the boot CPU is configured to initialize the at least two initialized CPUs of the multiple CPUs according to a second instruction stored in the memory.

12. The computer system according to claim 6, wherein the booting process includes multiple tasks executable in parallel by the at least two initialized CPUs, and the booting process of the computer system is a computer program stored in the memory that includes a basic input output system (BIOS) module, a boot loader module and a kernel module.

13. The computer system according to claim 12, wherein steps from the BIOS module, the boot loader module and the kernel module are modularized into steps including independent or asynchronous steps, and the modularized steps are separated out to form tasks of the booting process.

14. The computer system according to claim 13, wherein peripheral devices initialization steps in the BIOS module are divided into initialization steps for initializing a device other than modifying a configuration register and register steps for modifying the configuration register based on the initialization steps, and the initialization steps and the register steps are separated out to form different tasks of the at least two tasks.

15. The computer system according to claim 6, wherein the selection information further comprise a size field indicating a size of each of the tasks, and
wherein the first CPU is further configured to determine whether to execute a task according to an available memory for executing tasks and size of the task.

16. The computer system according to claim 6, wherein the at least two initialized CPUs are configured to continue to select and execute the tasks according to the TDC until all tasks whose information is in the TDC are executed.

17. A non-transitory computer readable medium storing computer executable program codes for booting a computer system having multiple Central Processing Units (CPUs), wherein at least two CPUs of the multiple CPUs are initialized at start of the booting process and execute the program codes which includes instructions for:
accessing, by each of the at least two initialed CPUs, a task description chart (TDC) stored in the computer system, wherein when a first CPU of the at least two initialized CPUs accesses the TDC, the first CPU locks the TDC, and the locked TDC is not accessible by CPUs other than the first CPU;
selecting, by each of the at least two initialized CPUs, a task according to TDC, wherein the TDC includes information of a plurality of tasks of the booting process and selection information of the tasks; and
executing, by the at least two initialized CPUs, the selected tasks at least partially in parallel.

18. The non-transitory computer readable medium according to claim 17, wherein the selection information of the tasks further comprises a priority field indicating a priority of each of the tasks, and a task with a highest priority is first selected by the first CPU.

19. The non-transitory computer readable medium according to claim 17, wherein the selection information further comprises a dependency field indicating a dependency of a first task from a second task, and the first task is selectable when the second task is marked as completed.

20. The non-transitory computer readable medium according to claim 17, wherein after the first CPU selects a third task according to the selection information, the first CPU marks a lock field of the third task as locked, and wherein the third task being marked as locked is not selectable by the initialized CPUs other than the first CPU.

* * * * *